United States Patent [19]
Rieff

[11] Patent Number: 5,931,403
[45] Date of Patent: *Aug. 3, 1999

[54] WINDING FORM AND LEAD GUIDE ASSEMBLY

[75] Inventor: Duane W. Rieff, Fairborn, Ohio

[73] Assignee: Globe Products Inc., Huber Heights, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/769,858

[22] Filed: Dec. 19, 1996

Related U.S. Application Data

[60] Provisional application No. 60/008,945, Dec. 20, 1995.

[51] Int. Cl.$^6$ .................................................... H02K 15/09
[52] U.S. Cl. .......................... 242/433.4; 29/596; 242/433
[58] Field of Search ............................. 242/433.4, 433.3, 242/432.6; 29/596, 605

[56] References Cited

U.S. PATENT DOCUMENTS

| | | | |
|---|---|---|---|
| 3,713,208 | 1/1973 | Doyle | 29/597 |
| 3,713,598 | 1/1973 | Bucholtz et al. | 242/7.05 |
| 4,289,281 | 9/1981 | George et al. | 242/7.05 |
| 4,765,551 | 8/1988 | Page et al. | 242/7.05 |
| 4,974,313 | 12/1990 | Reiger, Jr. | 29/736 |
| 5,470,025 | 11/1995 | Banner et al. | 242/7.03 |
| 5,586,383 | 12/1996 | Dolgas et al. | 242/432.6 |

OTHER PUBLICATIONS

Commonly owned copending utility application serial no. 08/769,857 filed Dec. 19, 1996.

*Primary Examiner*—Katherine Matecki
*Attorney, Agent, or Firm*—Roger S. Dybvig

[57] ABSTRACT

An improved combined winding form and lead guide mechanism assembly is provided wherein a lead guide sliding assembly is located in a cavity in the winding form.

5 Claims, 4 Drawing Sheets

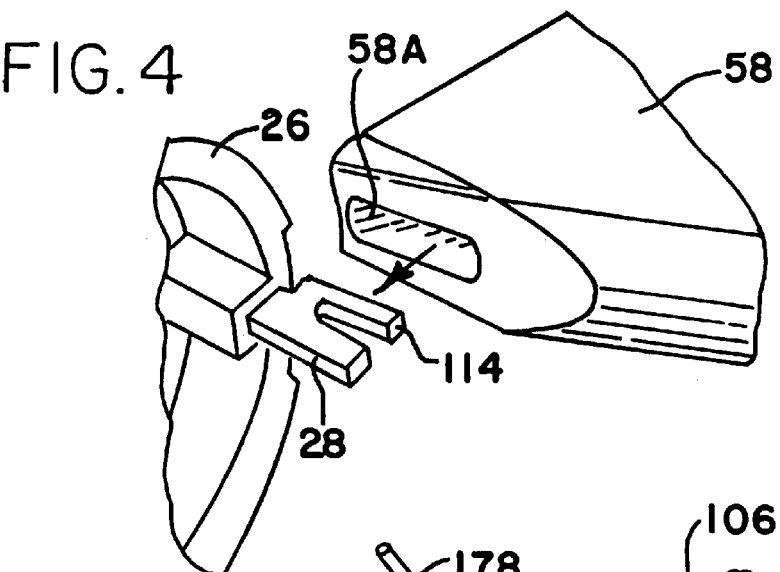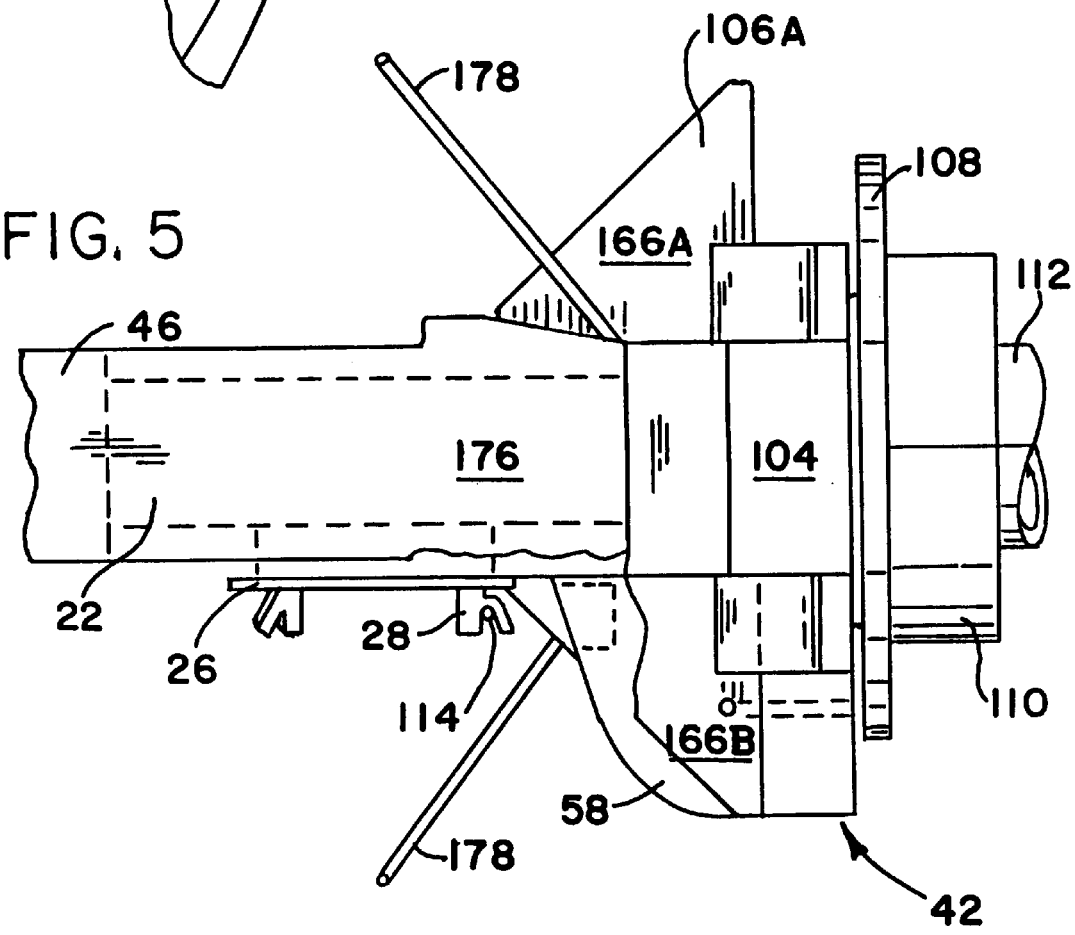

WINDING FORM AND LEAD GUIDE ASSEMBLY

CROSS-REFERENCE TO RELATED APPLICATIONS

This application claims the benefit of U.S. Provisional Application Ser. No. 60/008,945 filed Dec. 20, 1995. This application also has a sister application Serial No. 08/769,857, filed Dec. 19, 1996 which also claims the benefit of the above U.S. Provisional Application.

FIELD OF THE INVENTION

This invention relates to a winding form and lead guide assembly for use in winding electric motor stators and, though not so limited, to a winding form and lead guide assembly for use in winding stators for multiple phase, multiple pole electric motors, which stators have plural radially-extending and outwardly opening coil-receiving core slots separated by teeth so shaped that the radially-outermost ends of the coil-receiving slots are open. However, aspects of this invention may also be useful for winding other wound electric motor components.

INCORPORATION BY REFERENCE

The disclosures of U.S. Pat. No. 4,765,551 to Page et al., U.S. Pat. No. 4,915,313 to Banner et al., and U.S. Pat. No. 5,187,856 to Corey et al. are hereby incorporated herein by reference.

BACKGROUND OF THE INVENTION

It is known that improvements in the electrical characteristics of multiple-phase stators can be obtained by dividing each coil of each phase into two or more coil portions which are separated by coil portions of the other phases. Such a winding pattern may be referred to as a split-coil pattern. For example, in winding a three phase, eight pole stator, portions of the eight coils forming the first phase are wound, followed by portions of the eight coils forming the second phase, followed in turn by the winding of portions of the eight coils of the third phase. A second portion of the eight coils of the first phase is then wound into respectively the same core slots as the portions of the same first phase coils portions wound at the outset, and so forth, until all of the coils are wound. If each coil is wound in two portions, a total of 48 coil portions are wound.

In many instances of winding coils for a dynamoelectric device, such as a stator or armature, a single winding form configuration is sufficient for the winding of all of the coils. In such instances, the use of a conventional winding form assembly that has an integral lead guide mechanism having its lead guide-carrying components carried externally on one of the side plates is acceptable. However, in other instances, particularly in those cases in which the coil span subtends a shallow angle, such as in 4, 6 or 8 pole armatures or stators, it is desirable to use different winding forms having different wire-guiding characteristics for different sets of the coils to be wound. These different wire-guiding characteristic may be obtained, for example, by changing the side plates that form the winding form assembly. Removal and replacement of such side plates can be a complex task, and the costs of side plates quite high if, as often the case, the winding form is provided with movable lead guides that assist in guiding the lead wires extending to and from the wound coils around tangs or hooks on a commutator of an armature being wound or on a terminal board affixed to a stator core being wound.

An object of this invention is to provide an improved winding form assembly with easily removable and replaceable side plates. A related object is to provide a winding form assembly having a lead guide mounted on a side plate and a lead guide actuating mechanism wherein the lead guide can be quickly and easily removed from both the lead guide actuating mechanism and the side plate and wherein the side plate can be removed from the rest of the winding form assembly without removing the lead guide actuating mechanism.

In furtherance of these objects, a combined winding form and lead guide mechanism assembly comprises a winding form having a center body and a pair of side plates, a lead guide member slidable on one of the side plates, a lead guide sliding assembly mounted within the center body, and a lead guide actuator slidably mounted within the winding form. The lead guide member is readily removable from its associated side plate and from the sliding assembly, and the side plates are readily removable from the center body. The lead guide sliding assembly remains with the center body so that it can be used with different side plates.

Other objects and advantages of this invention will become apparent in view of the following description taken in conjunction with the accompanying drawings.

BRIEF DESCRIPTION OF THE DRAWINGS

FIG. 4 is an enlarged, fragmentary perspective view of a portion of a lead guide assembly located adjacent a terminal projecting from a stator core.

FIG. 5 is a fragmentary, top plan view of the portion of the apparatus shown in FIG. 2.

DETAILED DESCRIPTION

Figure 2:
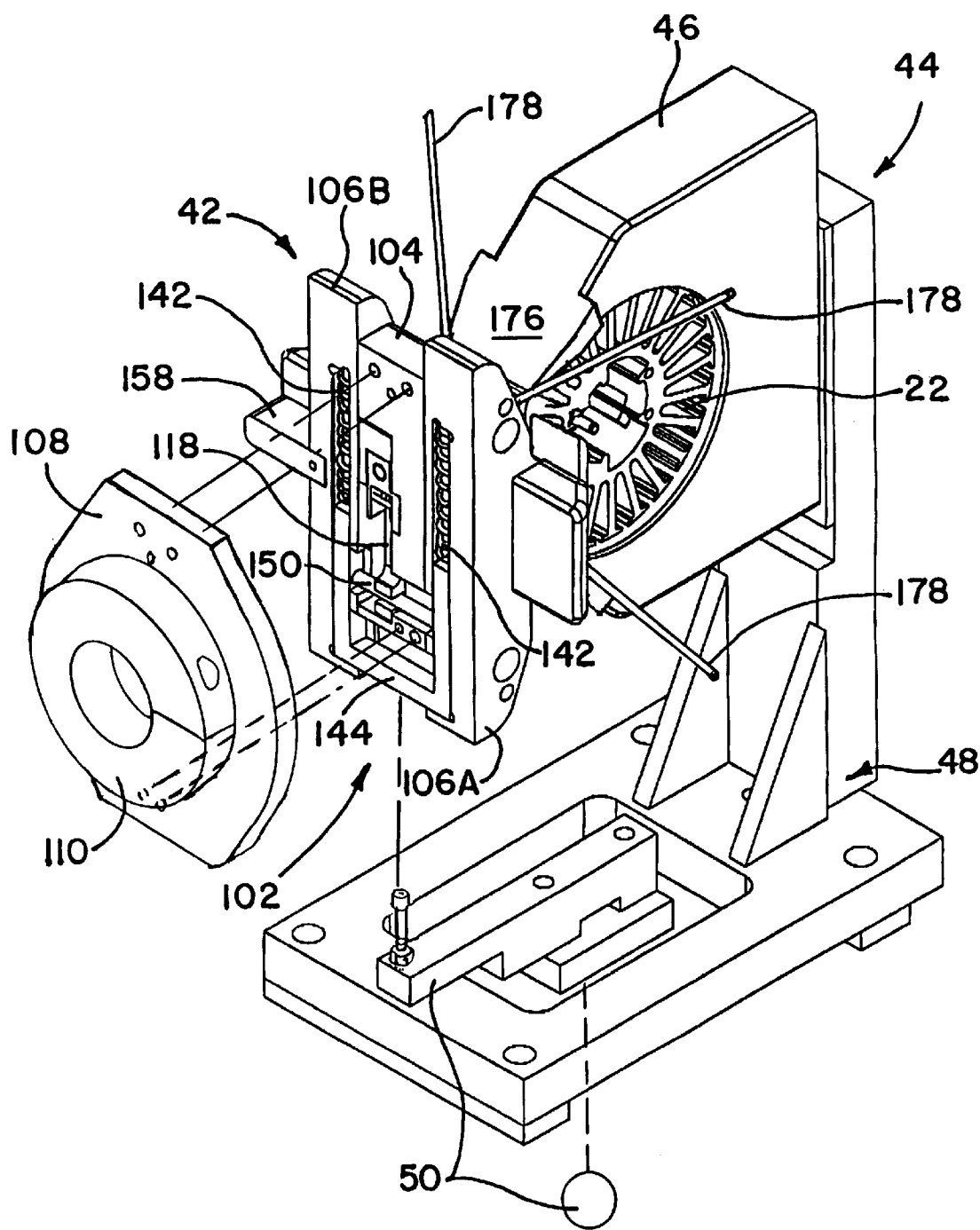
FIG. 2 is a partly-exploded, perspective view of the apparatus of this invention showing a combined winding form and lead guide assembly and a center wire guide.
Figure 3:
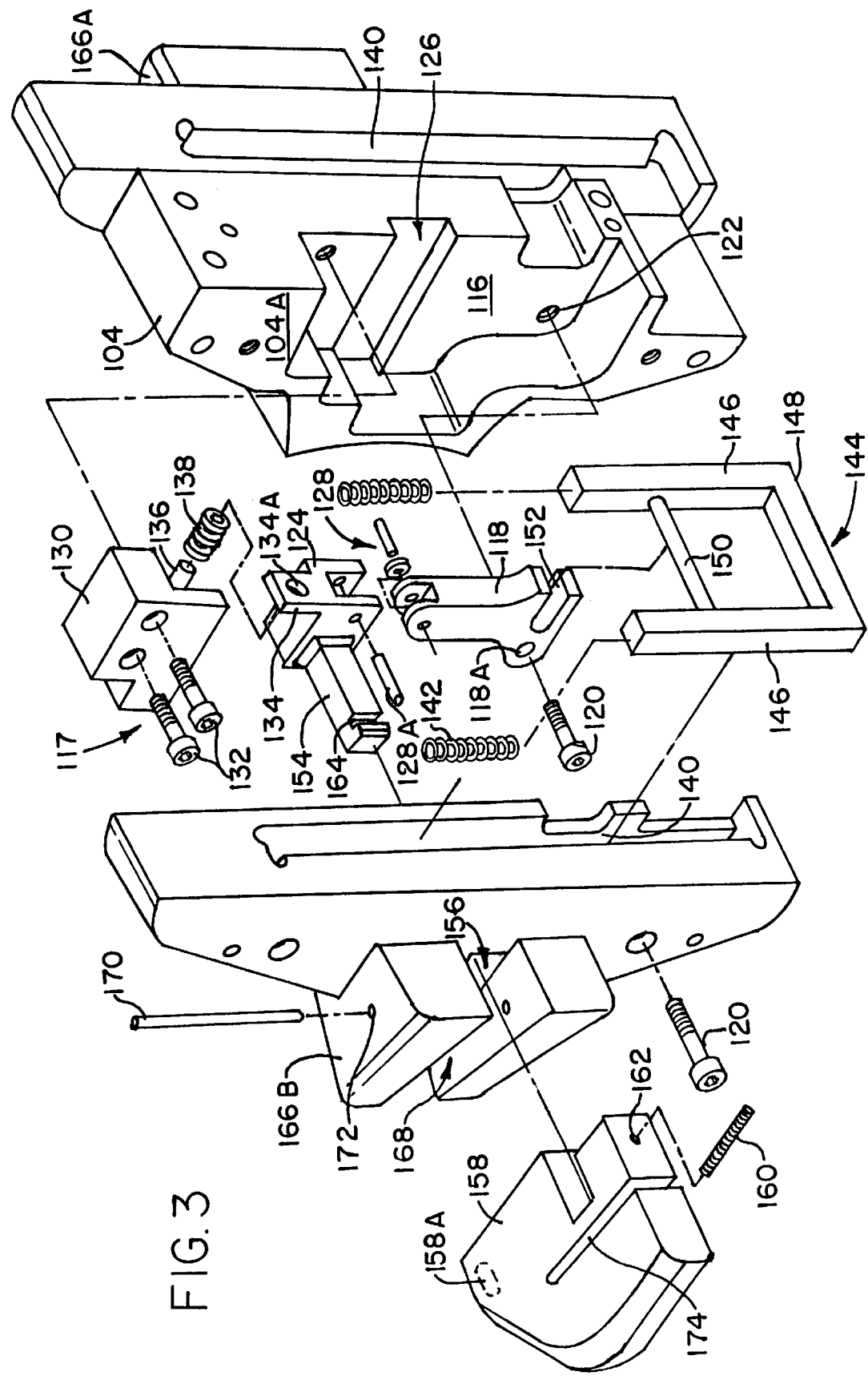
FIG. 3 is an exploded, perspective view of the winding form and lead guide assembly of FIG. 2, but shown on a larger scale than FIG. 2.

With reference to FIGS. 2 and 3, this invention is shown in connection with an improved winding form assembly 42 including an integral lead wire guiding or a so-called lead guide mechanism 102. Generally, the winding form assembly 42 differs from conventional winding form assemblies in that the lead guide sliding assembly of the lead guide mechanism 102 is located internally of the assembly 42.

Figure 1:
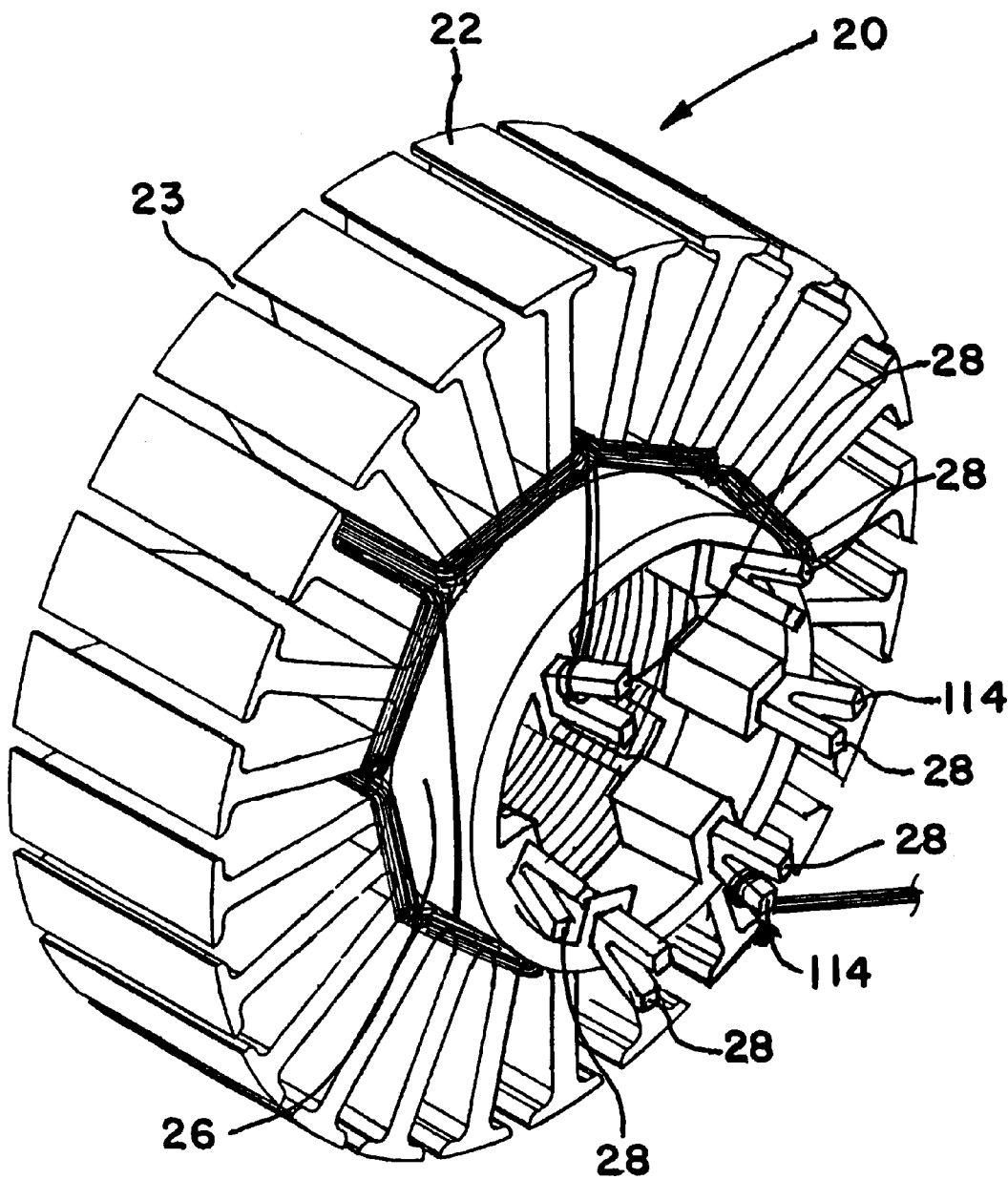
FIG. 1 is a perspective view of partially wound stator which may be wound and connected using the apparatus of this invention.

The winding form assembly 42 includes a center chuck body 104 fixed between a pair of side plates 106, namely a front side plate 106A and a rear side plate 106B. Both the chuck body 104 and the side plates 106 have highly polished surfaces over which insulated magnet wire is coursed into slots 23 in the stator core 22 to form stator coils (FIG. 1). As will be described below in further detail, a center wire guide 46 (FIG. 2) is also provided to assist in guiding the magnet wire into the slots 23.

With reference to FIG. 2, the winding form assembly 42 is mounted upon a mounting or backing plate 108 provided with a bearing housing or clamp 110. The clamp 110 is affixed to the outer race of a bearing (not shown) on the end of a flier spindle 112 (FIG. 5). Form assembly 42 is located adjacent the forward end of the shaft 56, as shown in FIG. 1.

With particular reference again to FIG. 3, the winding form assembly 42 includes an integral lead guide actuator mechanism, generally designated 102. As will be evident to one skilled in the art, the lead guide mechanism 102 is provided to ensure that coil lead wires are properly hooked or looped about tangs 114 on stator terminals 28, as partially illustrated in FIGS. 4 and 5. In this respect, it will be understood that the winding form assembly 42 and this aspect of the instant invention are equally applicable to both the manufacture of electric motor stators and armatures. Thus, the lead guide mechanism 102 could also be used to ensure that lead wires are properly looped or hooked about tangs projecting from a commutator of a conventional electric motor armature.

Traditionally, the lead guide sliding assembly of lead guide mechanisms have been located externally of the side plates forming a winding form assembly. So that the side plates 106 may be readily removed and replaced with other side plates 106 providing different wire-guiding characteristics, the instant invention provides a winding form assembly 42 wherein the lead guide sliding assembly 117 of the lead guide mechanism 102 are located in a cavity 116 formed in the center chuck body 104.

With continued reference to FIGS. 2 and 3, the center chuck body 104 includes a cavity 116 that opens to the rear face 104A of the chuck body 104. The lead guide sliding assembly, generally designated 117, is located in the recess 116. The assembly 117 includes a pivotal finger 118 secured in the cavity 116 by use of a screw 120. The screw 120 passes through an aperture 118A in the finger 118, thereby forming a pivot pin, and is received in a tapped bore 122 in the surface of the cavity 116. A slide 124 is disposed in a longitudinal slot 126 in the surface of the cavity 116 and is further pivotally carried on the upper end of the finger 118 by roller assembly, generally designated 128. As is evident, pivotal movement of the lead guide finger 118 is then translated into linear movement of the slide 124 in the slot 126. A retainer pin 128A prevents the slide 124 from moving laterally from the finger 118.

A slide retainer 130 is secured to the rearwardly-facing surface of the cavity 116 above the slot 126 by means of a pair of screws 132 to retain the slide 124 in the slot 126, thereby confining the slide 124 to lateral movement. The slide 124 includes an upstanding plate 134 having a guide aperture 134A formed therein which receives a complimentary rod 136 on the slide retainer 130 to further guide the movement of the slide 124. A spring 138 is disposed about the rod 136 between the retainer 130 and the plate 134 to bias the slide 124 toward the open end of the slot 126, i.e. to the right in FIG. 3.

With continued reference to FIG. 3, the side plates 106 each have an elongated slot 140 that receives a spring 142 in the upper portion thereof, which spring 142 is shown compressed in FIG. 3. A U-shaped lead guide actuator, generally designated 144, has its arms 146 slidably disposed in the lower portions of respectively opposite ones of the slots 140 with the upper ends of the arms 146 in contact with the respective springs 142. Accordingly, the springs 142 bias the lead guide actuator 144 downward. For reasons which will become apparent, a cross bar 148 extends between the lower ends of the arms 146, and a separate drive bar 150 extends between the arms 146 intermediate the ends thereof. The drive bar 150 is aligned with and extends through the notch 152 in the finger 118. Thus, the lead guide actuator 144 may be driven upwardly by a lead guide operator, generally designated 50 (FIG. 2), to thereby pivot the finger 118, which results in lateral movement of the carrier slide 124. The drive mechanism may be similar to conventional drive mechanisms used for known winding forms and lead guide mechanisms for flier-type armature winding machines.

The slide 124 includes a longitudinally-extending arm 154 that extends through a laterally-extending opening 156 in the rear side plate 106B, as shown in FIG. 3. A lead guide member 158 is detachably mounted to the arm 154 by use of a ball-plunger assembly 160 that is threaded into a tapped bore 162 in the lead guide member 158 and engages a notch 164 in the arm 154. The lead guide member 158 has a tang-covering pocket 158A formed therein and is readily removed for replacement or repair or for purposes of switching side plates, as described above.

With further reference to FIG. 3 (and also FIG. 5), the side plates 106A and 106B each include longitudinally-extending wire guide portions 166A and 166B, respectively. The wire guide portions 166B of the rear side plate 106B have lateral slot 168 formed therein in which the lead guide member 158 is disposed. Accordingly, the slot 168 serves as a guide for the lead guide member 158. In addition, a removable guide pin 170 extends downwardly through an aperture 172 in the guide surfaces 166 of the rear plate 106B. Such pin 170 projects downwardly through a laterally-extending notch 174 formed in the lead guide member to further assist in guiding lateral movement of the lead guide member 158.

Although the presently preferred embodiments of this invention have been described, it will be understood that within the purview of the invention various changes may be made within the scope of the following claims.

Having thus described my invention, I claim:

1. In a combined winding form and lead guide mechanism assembly comprising a center body having mutually-opposed first and second side faces, a pair of side plates, one attached to each of said side faces, and a lead guide mechanism comprising a lead guide sliding assembly and a lead guide member mounted on said sliding assembly, the improvement wherein said lead guide sliding assembly is disposed in a cavity in said center body and has an arm which projects through one of said side plates, said lead guide member being mounted on said arm.

2. A combined winding form and lead guide mechanism assembly comprising:

a center body having mutually-opposed first and second side faces, said body having a hollow cavity formed therein;

first and second side plates attached to and substantially covering said first and second side faces of said body, respectively; and a lead guide mechanism comprising:
(a) a lead guide sliding assembly located in said cavity, said assembly including:
a pivotal lead guide finger, and
a slide pivotally carried by said finger and confined for lateral movement, said slide having a longitudinally-extending arm extending through a laterally-extending slot in one of said side plates; and
(b) a lead guide member mounted on said arm, said lead guide member being located externally of said cavity and said one of said side plates.

3. The assembly of claim 2 wherein said cavity opens to the side face of said body to which said one of said side plates is attached.

4. The assembly of claim 2 wherein said lead guide member is detachably connected to said arm.

5. The assembly of claim 2 wherein said slide, and thereby said lead guide member, move laterally in response to pivotal movement of said lead guide finger.

* * * * *